July 27, 1926.

E. B. CARTER

GUIDE ASSEMBLY

Filed March 23, 1925  2 Sheets-Sheet 1

1,593,689

Inventor
Edward B. Carter
by James R. Hodder
Atty.

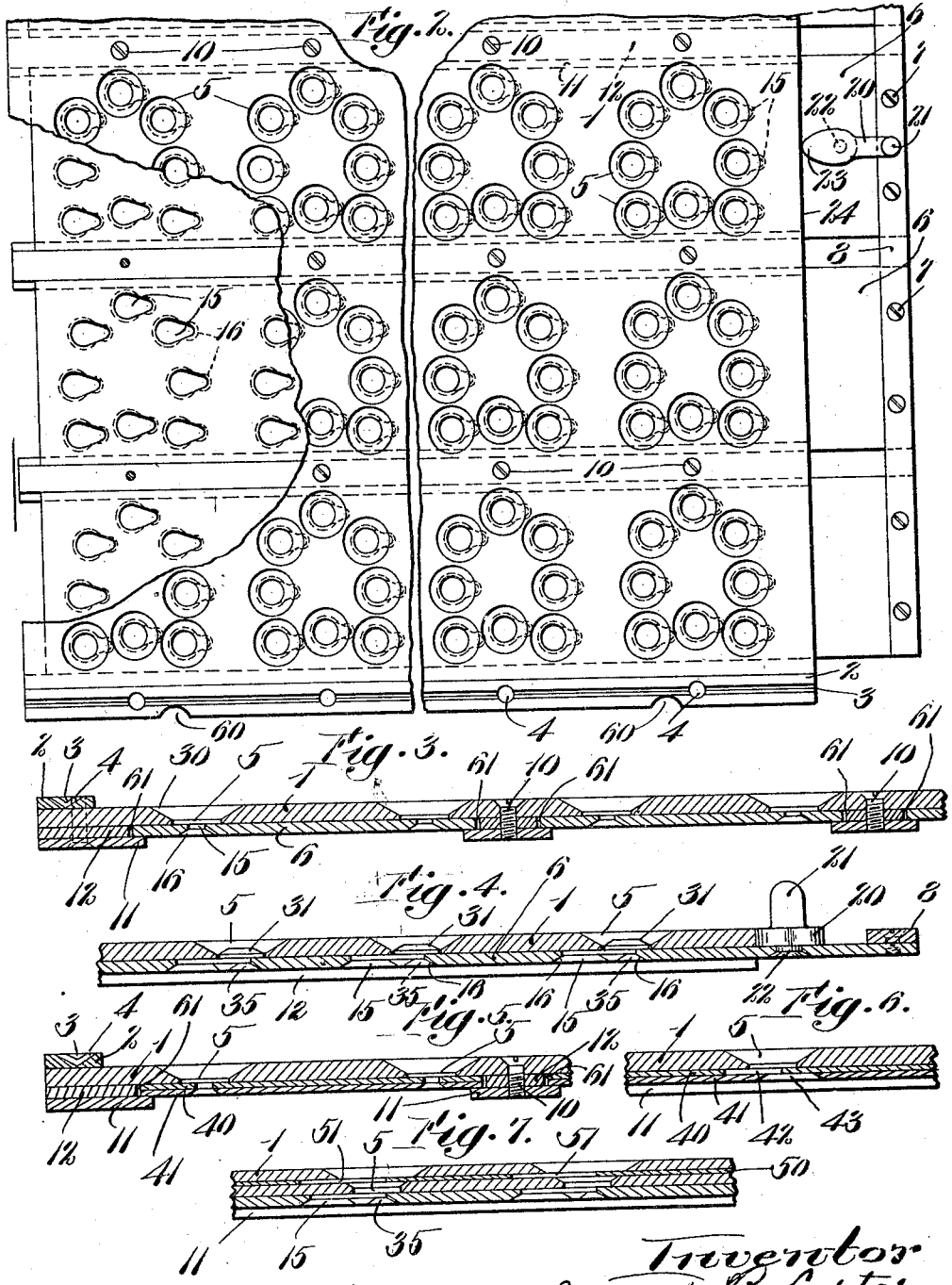

Patented July 27, 1926.

1,593,689

UNITED STATES PATENT OFFICE.

EDWARD B. CARTER, OF BOSTON, MASSACHUSETTS.

GUIDE ASSEMBLY.

Application filed March 23, 1925. Serial No. 17,687.

My present invention relates to guide assemblies, and more particularly to such guide assemblies utilized as transfer plates, or assemblies.

In many lines of industry, there are utilized gang molds, or the like, in which must be positioned a plurality of articles, prior to the completion in said gang molds, of the product made therein.

In every instance of which I am aware, such articles are positioned in the gang molds by hand, thus requiring skilled labor, and resulting in an expensive and tedious operation. For example, in the manufacture of rubber heels, wherein are utilized gang molds, having a plurality of heel layouts, each layout being provided with a plurality of pins in said mold, it is necessary to position, on each pin in said layouts, a washer, for the proper manufacture of the rubber heels. Heretofore these washers have been placed on the pins by hand. For an expert operator to position washers on each pin in a gang mold having a capacity of four hundred washers, requires at least six minutes, whereas by the use of my novel assembly, it is possible to load a mold of from four hundred to one thousand washers in a very few seconds.

In my prior and co-pending application, Serial No. 724,982, I have illustrated one form of guide assembly. My present invention is an improvement over said prior guide assembly, and may be utilized not only in the washering of heel gang molds, but in any industry wherein is required the positioning or feeding of a plurality of articles, simultaneously, to a gang mold, or the like.

In actual factory operation, my present novel guide assembly, will position such articles in a gang mold, with an average of one article in three thousand improperly positioned, so that my present device can be said to be substantially one hundred per cent perfect.

It will be appreciated that my present transfer plate can be utilized in many lines of work, and that I have referred to the washering of pins in a heel gang mold, merely as an illustrative example of the utility of my present device.

An important object of my present invention, therefore, consists in providing a guide assembly or transfer plate, which will deliver any predetermined plurality of articles in any predetermined position, simultaneously.

A further feature of my invention consists in providing such a guide assembly or transfer plate, with means to hold the articles to be transferred thereby, in position, and prevent the articles from dropping or falling from the transfer plates, regardless of the position of same.

A further feature of my present invention is that a guide assembly constructed as herein described, will have a great degree of flexibility, and is sufficiently light to afford a great advantage over the guide assembly shown in my prior application, above referred to.

Further features of the invention, novel combinations of parts, and advantages, will be herein more fully pointed out and claimed.

Referring to the drawings, illustrating preferred embodiments of my invention,

Fig. 2 is a fragmentary top plan view of my novel transfer plate in opened position;

Fig. 3 is a cross sectional view on the line 3—3 of Fig. 1;

Fig. 4 is a cross sectional view on the line 4—4 of Fig. 1;

Fig. 5 is a cross sectional view of a modification of my present invention, corresponding in position to Fig. 3;

Fig. 6 is also a cross sectional fragmentary view of the modification shown in Fig. 5, on a line similar to that of Fig. 4; and Fig. 7 is a fragmentary cross sectional view of a further modification of my invention.

Figure 1:
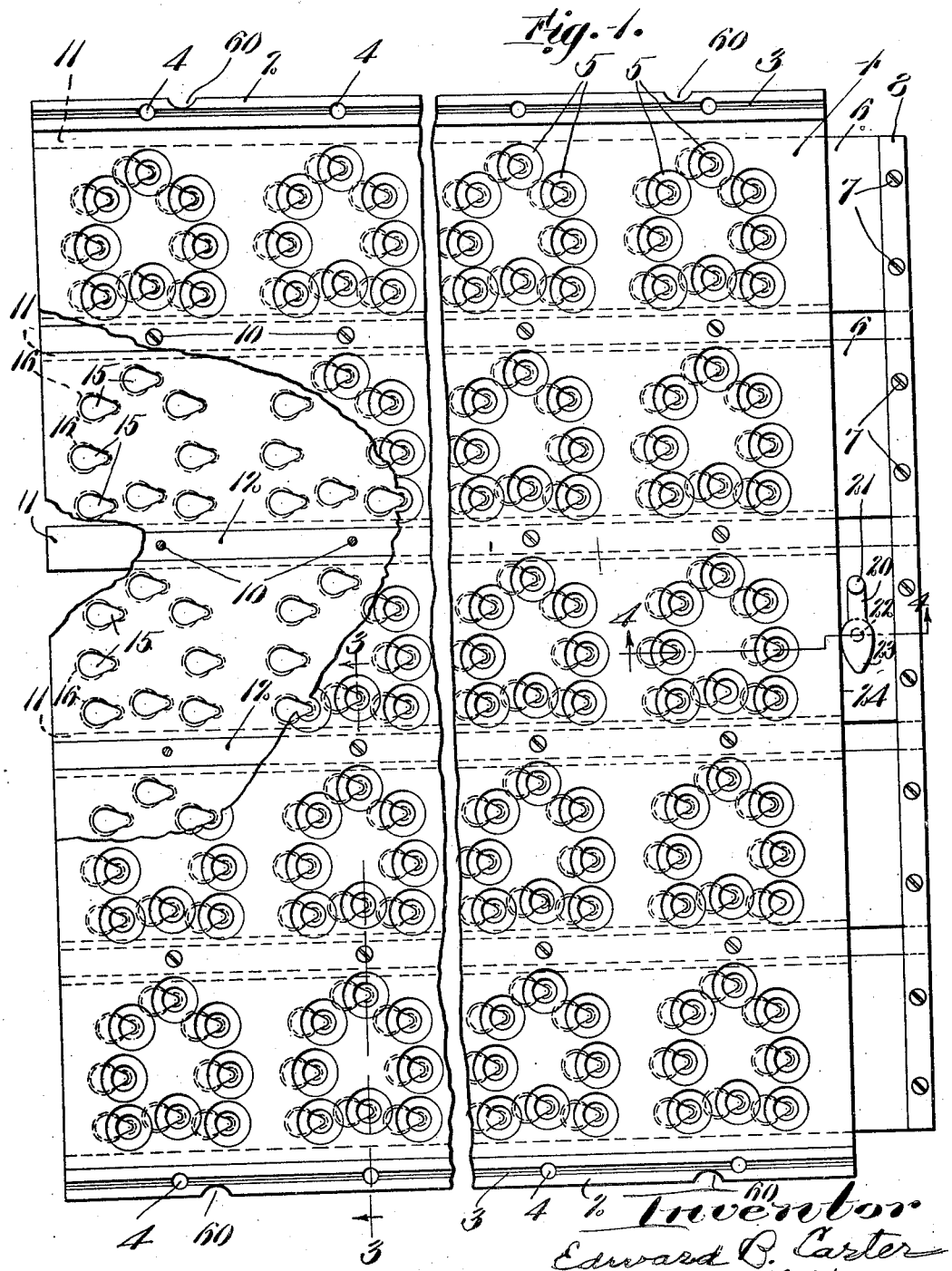
Fig. 1 is a top plan view, partly broken away, of my novel guide assembly.

As shown in Fig. 1, my novel guide assembly or transfer plate comprises a flat rectangular plate 1, of phenol-formaldehyde artificial resin, laminated material unpregnated or cemented with artificial resin as a binder, or other suitable material. Guideways 2, 2, are applied to either side of this plate 1, said guideways having therein grooves 3, 3, permitting a magazine or other device to slide over the guide assembly. It will be appreciated that I may omit these guides, if desired. In the present application, my guide assembly is illustrated as constructed for the purpose of applying washers to heel gang molds, and on the assembly are shown a plurality of heel layouts, to correspond with the pins in a gang mold, having corresponding layouts. In the guideways 2, at each end of a row of layouts, I have provided countersinks or other depressions 4, 4, for the purpose of lining up any desired feeding device with the layouts on the assembly. The plate 1 has formed therein, a plurality of ports 5, 5, these ports at their smaller portions being of approximately the same size as the article to be received therein, and being flared upwardly, so that an article fed thereto, if not fed accurately, will still slide downwardly into correct carrying position on the assembly, thus providing automatic centering means on the top plate.

Underneath the plate 1 I provide a plurality of flat sliding plates 6, 6, preferably of metallic material, five of these plates being herein shown. These plates 6 are secured at one end by screws 7, 7 to a reinforcing strip 8. By means of this strip 8 also, plates 6 are capable of being moved simultaneously. Secured to the plate 1 by means of screws, or the like, 10, 10, are a plurality of strips 11, 11, preferably of metallic material, these strips 11 providing slideways for the plates 6. Between these strips 11 and the body plate 1, I provide a plurality of spacing members 12, 12, to afford proper clearance between the strips 11 and body plate 1 for the sliding plates 6. These sliding plates 6 are formed with a plurality of ports 15, 15, 15, corresponding in number to the ports 5, in the plate 1, and normally held out of the registration with the ports 5, as clearly shown in Fig. 1. These ports 5 are preferably ovoid, or pear-shaped, and are flared on their under parts as shown at 16, 16. On one side of the plate 1 is provided a handle 20, having thereon a projection 21, and being pivoted at 22. The end of the handle 20 opposite the projection 21 is cam-shaped, as shown at 23. When the ports 5 have been loaded with articles to be transferred, and the transfer plate or assembly is in position on the mold or other device to which it is desired to fit these articles, a slight pressure to the right, as shown in Fig. 1 on the projection 21, will force the cam 23 against the side 24 of the plate 1, until the apparatus assumes the position as shown in Fig. 2. When in the position, as shown in Fig. 2, the ports 15 in the sliding plates 6 are all in registration with the ports 5 in the top plate 1, so that the articles carried by the transfer plate will drop or fall through its registering ports, by their own weight.

Fig. 3 illustrates in cross sectional view, the assembly as above described. The ports 5, in Fig. 3, are clearly illustrated as flared at 30, thus allowing any article, such as a washer 31, for example, as shown in Fig. 4, to be fed thereto, and be accurately positioned in said ports 5, whether or not the means to feed said washers or other articles to the ports, is in true alinement therewith. These flared ports, therefore, operate as automatic centering means.

Fig. 4 illustrates a portion of my novel assembly with washers 31, 31, 31 in the ports 5, with the apparatus in normally closed position. The ports 15 are flared at 16, as above described, to permit the ready positioning of the assembly on any device to which it is desired to feed the articles carried by said assembly. For example, in washering the pins in a heel gang mold, the assembly being positioned on the mold, the pins would normally enter the ports 15 at the point 35, being guided thereto by the flared edges 16 of the smaller opening 35 of the ports 15. When so positioned, movement of the handle 20, as above described, will move the sliding plates outwardly, or to the right, until the ports 15 are in alinement with the ports 5, thus permitting the washers or other articles held in the ports 5, to drop completely through the assembly, and be positioned where desired.

The operation of my guide assembly, as thus far described, will be readily understood. It being desired to accurately position a plurality of articles, the ports in the guide assembly are loaded with said articles, either by hand or by any suitable loading apparatus. Thereupon, the assembly is moved into position on the apparatus to which the articles are to be fed, or the assembly may be loaded while in position on such device. The operator then moves the handle 21 from the position shown in Fig. 1 to the position as shown in Fig. 2, whereupon the articles in the ports 5 of the top plate 1, will drop through the ports 15 in the sliding plates 6, and on to the device to which they are intended to be fed.

It will thus be seen that I have devised an extremely efficient, economical, and advantageous transfer plate or guide assembly, and one which is capable of being used in many lines of industry. My present device is also extremely economical in use, in that it reduces the time heretofore required in applying such articles to the molds, or the like, and reduces the number of operators heretofore required to perform this work. I believe that my present guide assembly is novel, and I therefore wish to claim the same herein broadly.

Referring now to Figs. 5 and 6, wherein a modification of my novel guide assembly is shown, I may utilize the same top plate 1, strips 11, screws 10, and spacing members 12, together with the guideways 2, grooves 3 and depressions 4, the plate 1 having therein the ports 5, 5. In this modification I utilize two sliding plates 40 and 41, these sliding plates having therein ports 42 and 43, respectively, said ports being normally out of alinement with the ports 5 in the plate 1. When it is desired to discharge articles from the assembly, the plates 40 and 41 are moved in opposite directions, until the ports 42, 43 and 5 are all in registration, whereupon the articles carried by the assembly would be discharged, in the same manner as described heretofore. The plates 40 and 41 are preferably operated in the same manner as the sliding plates 6, above described.

In Fig. 7 I have illustrated a further modification, and one which can be applied to both of the forms above described. This modification comprises a locking plate 50, positioned in the top plate 1, and slidable therein. This sliding plate 50 is provided with ports 51, 51, normally in registration with the ports 5 in the plate 1. When the assembly is loaded with the articles to be transferred or fed therefrom, this plate 50 can then be moved into the position shown in Fig. 7, or further to the left, if desired, until the articles in the ports 5 are securely held in position by this locking plate 50. The assemblies may then be placed in any position desired, without danger of the articles carried thereby being dropped or lost from the assembly. A plurality of assemblies thus equipped, can be loaded, the locking plates 50 closed, and the assemblies stacked on edge, for conservation of space, if desired, until ready for use.

I believe that the two modifications last described are also novel, and I desire to claim the same herein broadly. While I have necessarily shown and described my present invention somewhat in detail, it will be appreciated that I am not limited thereto, but may vary the size, shape, and arrangement of parts, within wide limits, without departing from the spirit of the invention. It will also be appreciated that I may design my present novel assemblies, for use in any industry, or any class of work, wherein it is desired to accurately feed a plurality of articles into desired position, simultaneously.

By utilizing the flared ports 5 in the top plate 1 I am enabled to feed articles of varying sizes to this assembly, providing these articles are of no greater diameter than the smallest diameter of the ports 5. Such articles, of varying sizes, striking the flared sides of the ports 5, would be automatically centered therein, thus compensating for any variation or unevenness in the positioning of the magazines or other means to feed the articles to the ports in the transplate. These flared ports are a great advantage, and of great utility in such a guide assembly. Thus, for example, magazines carrying varying sizes of washers, could all be utilized on a guide assembly such as herein illustrated and described. The flared sides of the ports 5 would serve as guiding means to center the articles in these ports, as above described.

Since all gang molds in use in the rubber heel industry, and also in other lines, are provided with dowel pins on their outer edges, I have provided my present transfer plate with semi-circular ports or notches 60, a sufficient number of these notches 60 being provided to fit any predetermined number of dowel pins on the mold. Thus, when the assembly is positioned on the mold, the notches 60 will engage with the dowel pins on the mold, and hold the assembly in position.

In utilizing an assembly of the type herein shown, having a number of sliding plates, it is desirable to have some lateral "play", to provide for inequalities in the positioning of the pins in the heel mold, or the like. As shown in Figs. 3 and 5, I provide a slight clearance between the sides of the sliding plates 6, and the spacing strips 12, as indicated at 61. Thus, when the loaded assembly is positioned on a mold, if a pin were so out of alinement that it would strike the very edge of the bevelled portion 16, of the port 15, the play or clearance allowed at 61 would permit that particular sliding plate to move to one side or the other to compensate for this inequality or uneven positioning of the pin, in spite of necessitating the moving of the entire assembly.

I believe that these last named features, viz: the dowel engaging notches, and the lateral clearance for the sliding plates are new, and I desire to claim the same herein.

My invention is further described and defined in the form of claims as follows:

1. A guide assembly of the kind described, comprising a plate having a plurality of vertically flaring ports therein, a plate slidably mounted beneath the first plate, and having downwardly flaring ports adapted to cooperate with the ports in the first plate.

2. A guide assembly of the kind described, comprising a plate having a plurality of vertically flaring ports therein, a plate slidably mounted beneath the first plate, and having downwardly flaring slotted ports adapted to be brought into and out of registration with the first ports.

3. A guide assembly of the kind described, comprising a plate having a plurality of vertically flaring ports therein, a plate slidably mounted beneath the first plate, and having downwardly flaring slotted ports adapted to be brought into and out of registration with the first ports, and means for operating the sliding plate to feed articles from the first ports through the ports in the sliding plate.

4. A guide assembly of the kind described, comprising a plate having a plurality of vertically flaring ports therein, a plate slidably mounted beneath the first plate, and having downwardly flaring slotted ports adapted to be brought into and out of registration with the first ports, and manually operable means for operating the sliding plate to feed articles from the first ports through the ports in the sliding plate.

5. A guide assembly of the kind described, comprising a plate having upwardly flaring ports therein adapted to receive and automatically center articles received thereby, a sliding plate mounted under said first plate, and having ports adapted to be moved into and out of registration with the first ports, said second ports being downwardly flared to act as guiding means for positioning the guide assembly on any device to which the articles carried by said guide assembly are to be fed.

6. A guide assembly of the kind described, comprising a plate having a plurality of vertically flaring ports therein, a plurality of plates slidably mounted beneath the first plate, and having downwardly flaring ports adapted to cooperate with the ports in the first plate.

7. A guide assembly of the kind described, comprising a plate having a plurality of vertically flaring ports therein, a plurality of plates slidably mounted beneath the first plate, and having downwardly flaring slotted ports adapted to be brought into and out of registration with the first ports.

8. A guide assembly of the kind described, comprising a plate having a plurality of vertically flaring ports therein, a plurality of plates slidably mounted beneath the first plate, and having downwardly flaring slotted ports adapted to be brought into and out of registration with the first ports, and means for operating the sliding plates to feed articles from the first ports through the ports in the sliding plate.

9. A guide assembly of the kind described, comprising a plate having a plurality of vertically flaring ports therein, a plurality of plates slidably mounted beneath the first plate, and having downwardly flaring slotted ports adapted to be brought into and out of registration with the first ports, and manually operable means for operating the sliding plates to feed articles from the first ports through the ports in the sliding plate.

10. A guide assembly of the kind described, comprising a plate having upwardly flaring ports therein adapted to receive and automatically center articles received thereby, a plurality of sliding plates mounted under said first plate, and having ports adapted to be moved into and out of registration with the first ports, said second ports being downwardly flared to act as guiding means for positioning the guide assembly on any device to which the articles carried by said guide assembly are to be fed.

11. A guide assembly of the kind described, comprising a plate having a plurality of vertically flaring ports therein, a plurality of super-imposed plates slidably mounted beneath the first plate, and having ports adapted to cooperate with the ports in the first plate.

12. A guide assembly of the kind described, comprising a plate having a plurality of vertically flaring ports therein, a plurality of super-imposed plates slidably mounted beneath the first plate, and having downwardly flaring ports adapted to cooperate with the ports in the first plate.

13. A guide assembly of the kind described, comprising a plate having a plurality of vertically flaring ports therein, a plurality of super-imposed plates slidably mounted beneath the first plate, and having downwardly flaring slotted ports adapted to be brought into and out of registration with the first ports.

14. A guide assembly of the kind described, comprising a plate having a plurality of vertically flaring ports therein, a plurality of super-imposed plates slidably mounted beneath the first plate, and having downwardly flaring slotted ports adapted to be brought into and out of registration with the first ports, and means for operating the sliding plates to feed articles from the first ports through the ports in the sliding plate.

15. A guide assembly of the kind described, comprising a plate having a plurality of vertically flaring ports therein, a plurality of super-imposed plates slidably mounted beneath the first plate, and having downwardly flaring slotted ports adapted to be brought into and out of registration with the first ports, and manually operable means for operating the sliding plates to feed articles from the first ports through the ports in the sliding plate.

16. A guide assembly of the kind described, comprising a plate having upwardly flaring ports therein adapted to receive and automatically center articles received thereby, a plurality of super-imposed sliding plates mounted under said first plate, and having ports adapted to be moved into and out of registration with the first ports, said second ports being downwardly flared to act as guiding means for positioning the guide assembly on any device to which the articles carried by said guide assembly are to be fed.

17. A guide assembly of the kind described, comprising a plate having upwardly flaring ports therein adapted to receive and automatically center articles received thereby, a sliding plate mounted under said first plate, and having ports adapted to be moved into and out of registration with the first ports, said second ports being downwardly flared to act as guiding means for positioning the guide assembly on any device to which the articles carried by said guide assembly are to be fed, and means to prevent dislodging of said articles from the guide assembly.

18. A guide assembly of the kind described, comprising a plate having upwardly flaring ports therein adapted to receive and automatically center articles received thereby, a sliding plate mounted under said first plate, and having ports adapted to be moved into and out of registration with the first ports, said second ports being downwardly flared to act as guiding means for positioning the guide assembly on any device to which the articles carried by said guide assembly are to be fed, and a plate slidably mounted in the first plate, to prevent dislodging of said articles from the guide assembly.

19. A guide assembly of the kind described, comprising a plate having a plurality of vertically flaring ports to receive and automatically center articles fed thereto, plates slidably mounted under the first plate, and having ports adapted to be moved into and out of registration with the first ports, and means on said assembly to guide and position devices for feeding articles to said assembly.

20. A guide assembly of the kind described, comprising a plate having upwardly flaring ports therein adapted to receive and automatically center articles received thereby, a plurality of sliding plates mounted under said first plate, and having side clearance for lateral oscillation, said sliding plates having ports adapted to be moved into and out of registration with the first ports, said second ports being downwardly flared to act as guiding means for positioning the guide assembly to any device to which the articles carried by said guide assembly are to be fed.

21. A guide assembly of the kind described, comprising a plate having upwardly flaring ports therein adapted to receive and automatically center articles received thereby, a plurality of sliding plates mounted under said first plate, and having side clearance for lateral oscillation, said sliding plates having ports adapted to be moved into and out of registration with the first ports, said second ports being downwardly flared to act as guiding means for positioning the guide assembly to any device to which the articles carried by said guide assembly are to be fed, and means on said assembly to hold the same in position on said device.

In testimony whereof, I have signed my name to this specification.

EDWARD B. CARTER.